United States Patent [19]
Park

[11] Patent Number: 5,919,111
[45] Date of Patent: Jul. 6, 1999

[54] GEAR TRAIN FOR A FOUR-SPEED AUTOMATIC TRANSMISSION USED IN VEHICLES

[75] Inventor: Dong Hoon Park, Kyungki-do, Rep. of Korea

[73] Assignee: Hyundai Motor Company, Seoul, Rep. of Korea

[21] Appl. No.: 08/915,864

[22] Filed: Aug. 21, 1997

[30] Foreign Application Priority Data

Aug. 30, 1996 [KR] Rep. of Korea ..................... 96-36743

[51] Int. Cl.[6] ................................................ F16H 3/62
[52] U.S. Cl. ...................... 475/269; 475/282; 475/903
[58] Field of Search ................................. 475/269, 271, 475/282, 290, 296, 330, 903

[56] References Cited

U.S. PATENT DOCUMENTS

| | | | |
|---|---|---|---|
| 2,478,868 | 8/1949 | Hasbany | 475/903 X |
| 4,224,838 | 9/1980 | Roushdy et al. | 475/903 X |
| 4,229,996 | 10/1980 | Hildebrand | 475/903 X |
| 5,106,353 | 4/1992 | Ra et al. | 475/269 X |
| 5,429,557 | 7/1995 | Beim | 475/282 X |
| 5,690,578 | 11/1997 | Hall, III | 475/269 X |

FOREIGN PATENT DOCUMENTS 4114462 11/1991 Germany ..................... 475/903

*Primary Examiner*—Rodney H. Bonck
*Assistant Examiner*—Sherry Lynn Estremsky

[57] ABSTRACT

A gear train for a four-speed automatic transmission used in a vehicle includes an input shaft connected to an engine, an intermediate shaft disposed parallel to the input shaft, a compound planetary gear set mounted on the intermediate shaft, an output shaft aligned with the intermediate shaft and connected to the compound planetary gear set, and plurality of brakes and clutches for selecting input and output element. The compound planetary gear set includes a first simple planetary gear set receiving power from the input shaft and a second simple planetary gear set receiving power from the input shaft, the second simple planetary gear being combined with the first simple planetary gear set in a radial direction.

3 Claims, 2 Drawing Sheets

| Friction Element | 14 | 16 | 18 | 20 | 22 | Remark |
|---|---|---|---|---|---|---|
| R | ○ | | | | ○ | |
| N | | | | | | |
| D 1 | ○ | | ○ | | | |
| D 2 | | ○ | ○ | | | |
| D 3 | ○ | ○ | | | | |
| D 4 | | ○ | | ○ | | |

GEAR TRAIN FOR A FOUR-SPEED AUTOMATIC TRANSMISSION USED IN VEHICLES

FIELD OF THE INVENTION

The present invention relates to a gear train, and more particularly to a gear train for a four-speed automatic transmission used in vehicles which, by utilizing a compound planetary gear set consisting of two simple planetary gear sets combined radially, makes possible the design of an automatic transmission having a short length to allow for easy application to a front-wheel-drive vehicle in which the vehicle engine is installed transversely.

DESCRIPTION OF THE RELATED ART

Generally, automatic transmission systems for vehicles comprise a transmission control unit (TCU) which automatically controls shift ratios according to changes in the running condition of the vehicle.

The above-described TCU switches a plurality of friction elements provided in a gear train between either operative or inoperative states to arrange one of the three essential elements of the planetary gear set (a sun gear, a ring gear, and a planetary carrier) as an input element, a reaction element, and an output element, thereby controlling the number of output revolutions.

There are different kinds of compound planetary gear sets used in automatic transmission systems including Ravigneaux-type, Simpson-type, and 2 Simpson-type compound planetary gear set.

Also, in order to be used as shifting means for vehicles, the above-described compound planetary gear sets has a structure in which planetary carriers of a first simple planetary gear set are connected to planetary carriers of a second simple planetary gear set, a structure where the planetary carrier and ring gear are connected through the sun gear, or a structure in which the planetary carriers of the first simple planetary gear set and ring gear of the second simple planetary gear set are directly connected to each other, namely, a structure wherein two planetary sets are connected in a direction of an axle.

However, the above-described structures increase the length of the automatic transmission in the direction of the axle such that mounting becomes difficult, especially when using the automatic transmission in a front-wheel-drive vehicle in which the engine is transversely mounted. Consequently, much time and effort are expended in shortening the automatic transmission during the design process.

SUMMARY OF THE INVENTION

The present invention has been made in an effort to solve the above problems.

It is an object of the present invention to provide a gear train for a four-speed automatic transmission used in vehicles which, by utilizing a compound planetary gear set consisting of two planetary gear sets combined in a radial direction, leads to a short automatic transmission allowing easy use in a front-wheel-drive vehicle in which the engine is transversely installed.

To achieve the above object, the present invention provides a gear train for a four-speed automatic transmission used in a vehicle, comprising:

an input shaft connected to the vehicle engine;

an intermediate shaft disposed parallel to the input shaft;

a compound planetary gear set mounted on the intermediate shaft, comprising:

a first simple planetary gear set receiving power from the input shaft; and a second simple planetary gear set receiving power from the input shaft, the second simple planetary gear being combined with the first simple planetary gear set in a radial direction;

an output shaft aligned with the intermediate shaft and connected to the first and second simple planetary gear sets to output power;

a clutch mechanism for selecting an input element of the compound planetary gear unit; and a brake mechanism for selecting a reacting element of the compound planetary gear unit.

According to another aspect of the present invention, the gear train further comprises first and second input gears mounted on the input shaft, wherein the first simple planetary gear set comprises a sun gear mounted on the intermediate shaft and connected to the first input gear; first planet gears meshing with the sun gear, the first planet gears being connected to each other by a first planet carrier; and a first ring gear, an inner circumference of which meshes with the first planet gears, the second simple planetary gear set comprises second planet gears meshing with an outer circumference of the first ring gear, the second planet gears being connected to each other by a second planet carrier; and a second ring gear, an inner circumference of which meshes with the second planet gears, and the first and second planet carriers are connected to each other by a connector connected to the output shaft.

The brake mechanism comprises a first brake interposed between a transmission housing and the first ring gear, a second brake interposed between the sun gear and the transmission housing, and a third brake interposed between the second ring gear and the transmission housing.

The clutch mechanism comprises a first clutch interposed between the first input gear and the sun gear, and a second clutch interposed between the second input gear and the second ring gear.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION OF THE PREFERRED EMBODIMENTS

Preferred embodiments of the present invention will now be described in detail with reference to the accompanying drawings.

Figure 1:
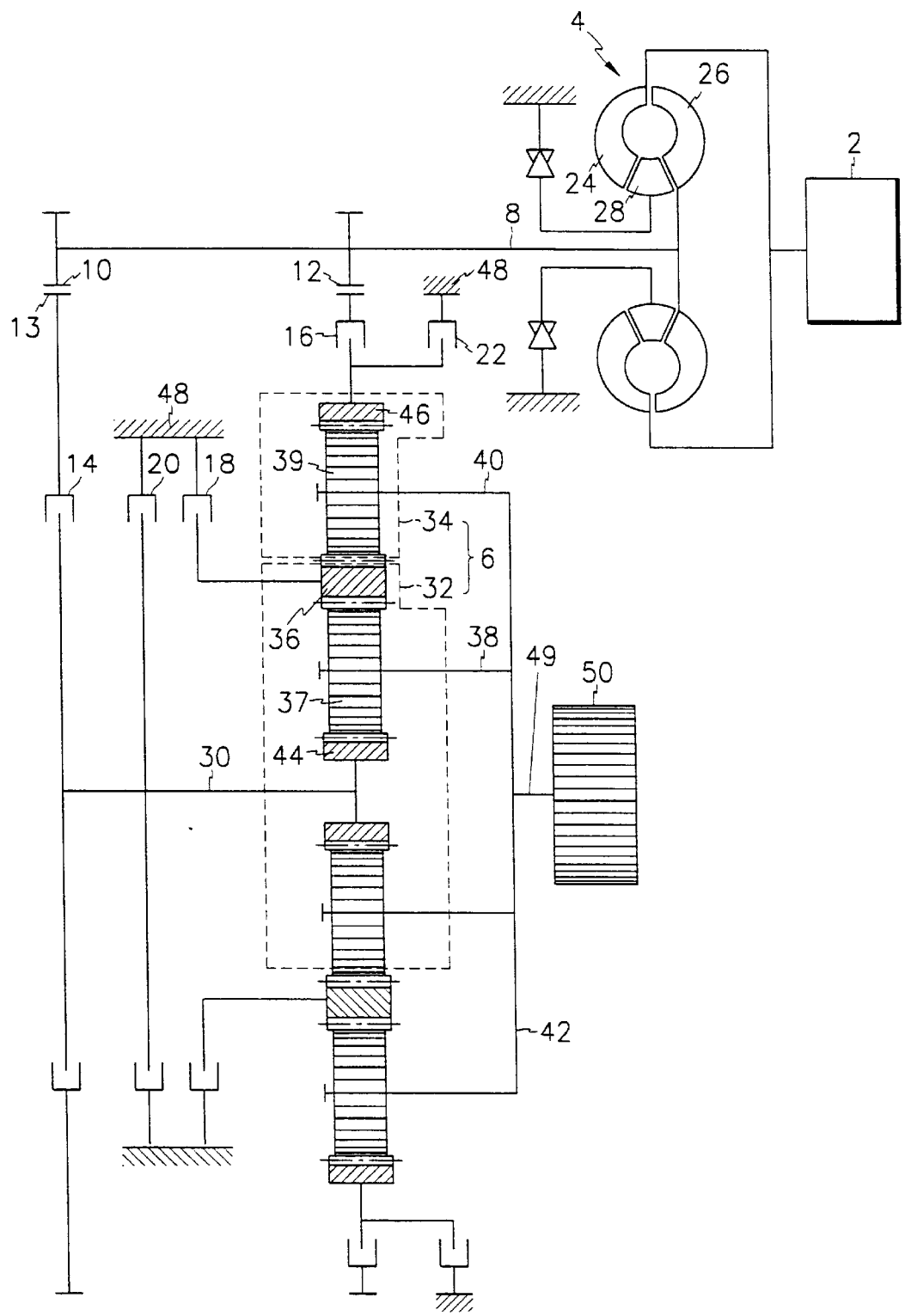
FIG. 1 is a schematic diagram of a gear train according to a preferred of the present invention.

Referring to FIG. 1, torque generated in an engine 2 passes through a torque converter 4 to realize torque conversion, and is then inputted to a compound planetary gear set 6 to realize shifting.

In the above-described gear train, the compound planetary gear set 6 is connected to first and second input gears 10 and 12 mounted on an input shaft 8, wherein at least one of the elements of the compound planetary gear set 6 acts as an input element through selective operation of a clutch device comprising a plurality of clutches 14 and 16. A least one of the elements acts as a reaction element in all forward speeds (excluding a forward third speed) through selective operation of a brake device comprising a plurality of brakes 18, 20 and 22.

The above-described torque converter 4, converting torque created in the engine 2, includes a pump impeller 24 directly connected to a crankshaft (not shown) of the engine 2; a turbine runner 26 mounted opposite the pump impeller 24 such that it rotates together with oil discharged from the pump impeller 24; and a stator 28 mounted between the pump impeller 24 and the turbine runner 26, which changes the flow of oil so as to increase the rotational force of the pump impeller 24.

In the above structure, when the engine 2 operates, oil in the torque converter 4 is discharged from the pump impeller 24 and is supplied to the turbine runner 26 to operate the same. After the turbine runner 26 is operated, the oil then flows to the stator 28.

The direction of the oil flowing to the stator 28 as is re-directed to the pump impeller 24. This operation is repeated. Here, by the rotation of the stator 28, a difference appears in the rotational force of the pump impeller 24 and that of the turbine runner 26 given to the stator 28, thereby realizing torque conversion.

Also, the compound planetary gear set 6, receiving converted torque from the torque converter 4, is mounted on an intermediate shaft 30 which is provided parallel to the input shaft 8 connected to the turbine runner 26 of the torque converter 4.

The compound planetary gear set 6 comprises first and second simple planetary gear sets 32 and 34 which are combined in a radial direction. That is, the first simple planetary gear set 32 comprises a sun gear 44 connected to an intermediate gear 13 meshing with the first input gear 10 of the input shaft 8 through the intermediate shaft 30, planet gears 37 connected to each other by a planet carrier 38 and meshing with the sun gear 44, and a ring gear 36, with an inner circumference of which the planet gears 37 mesh. The second simple planet gear set 34 comprises planet gears 39 connected to each other by a planet carrier 40 and meshing with an outer circumference of the ring gear 36 of the first simple planetary gear set 32 and an inner circumference of ring gear 46, meshing with the second input gear 12 of the input shaft 8. The planet carriers 38 and 40 are connected to each other by a connector 42. Therefore, the ring gear 36 of the first simple planetary gear set 32 is able to act as a sun gear for the second simple planetary gear set 34.

Further, operating as clutch means for transmitting engine power, the first clutch 14 is interposed between the intermediate gear 13 and the sun gear 44 of the first simple planetary gear set 32, and the second clutch 16 is interposed between the ring gear 46 of the second simple planetary gear set 34 and the second input gear 12 of the input shaft 8.

Therefore, through the selective operation of the first and second clutches 14 and 16, gears connected to these clutches are selectively operated as input elements.

Also, in the brake device, the first brake 18 is interposed between the ring gear 36 of the first simple planetary gear set 32 and a transmission housing 48. The second brake 20 is interposed between the sun gear 44 of the first simple planetary gear set 32 and the transmission housing 48. Finally, the third brake 22 is interposed between the ring gear 46 of the second simple planetary gear set 34 and the transmission housing 48. Therefore, gears locked by the brakes become reacting elements.

An output shaft 49 aligned with the intermediate shaft 30 is connected to the connector 42, and an output gear 50 acting as an output element is mounted on a free end of the output shaft 49.

Multi-plate clutches can be used for the first and second clutches 14 and 16, while band brakes can be used for the first, second and third brakes 18, 20 and 22.

Figures 2, 3:
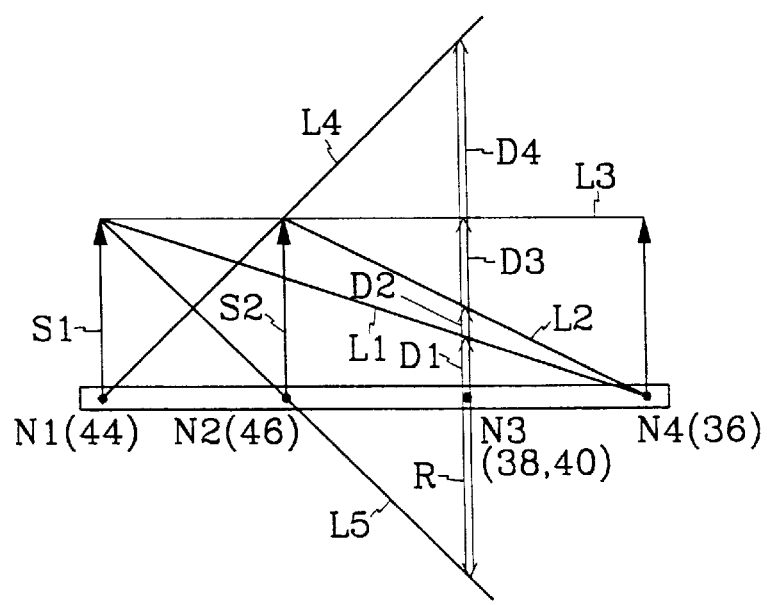
FIG. 2 is an operational chart of friction elements in each shift range according to a preferred embodiment of the present invention.
FIG. 3 illustrates operation of the first embodiment of the present invention through a lever analogy method.

As shown in the friction element operational chart of FIG. 2, in the gear train of the present invention structured as in the above, friction elements are selectively operated to realize shifting. The shift process will be explained hereinbelow with reference to the operational chart of FIG. 2 and the lever analogy diagram of FIG. 3.

In the lever shown in FIG. 3, a first node N1 indicates the sun gear 44 of the first simple planetary gear set 32, and a second node N2 indicates the ring gear 46 of the second simple planetary gear set 34. In addition, a third node N3 indicates the planet carriers 38 and 40 of the respective first and second simple planetary gear sets 32 and 34, and a fourth node N4 indicates the ring gear 36 of the first simple planetary gear set 32.

In the operational process of a forward first speed, the first clutch 14 and the first brake 18 are controlled to operate. As a result, the power of the input shaft 24 which is rotated through driving force received from the engine 2 is transmitted to the sun gear 44 of the first simple planetary gear set 32 by the operation of the first clutch 14, thereby making the sun gear 44 act as an input element. At the same time, the ring gear 36 of the first simple planetary gear set 32 acts as a reacting element because it is locked by the first brake 18. Through the above operations, first speed shifting is realized, and through the planetary carriers 38 and 40 of the respective first and second simple planetary gear sets 28, output is realized.

Referring to FIG. 3, with regard to the shift process of a first speed, a line connecting the third node N3 acting as an output element to a point on a line L1 connecting a first input speed line S1, inputted to the first node N1, to the fourth node N4 acting as a reacting element becomes a first output speed line D1.

Therefore, a number of output rotations becomes much smaller than a number of input rotations, thereby realizing the first speed.

In the above first speed state, if vehicle speed and throttle opening are increased, a transmission control unit (TCU) disengages the first clutch 14 and operates the second clutch 16.

As a result, the ring gear 46 of the second simple planetary gear set 34 becomes an input element by operation of the second clutch 16, thereby accomplishing a second speed.

Referring to FIG. 3, with regard to the shift process of the second speed, a line connecting the third node N3 to a point on a line L2 connecting a second input speed line S2, inputted at the second node N2, to the fourth node N4, acting as the reaction element, becomes a second output speed line D2, realizing output having a higher speed than the first speed.

In the above second speed state, if vehicle speed and throttle opening are increased, the TCU disengages the first brake 18 and operates clutch 14.

As a result, starting from the input state of the second speed, by the operation of the first clutch 14, second input is realized such that there are two input elements, enabling the realization of a third speed.

Referring to FIG. 3, with regard to the shift process of a third speed, a line connecting the third node N3 to a point on a line L3 connecting the first input speed line S1, inputted at the first node N1, to the second input speed line S2, inputted at the second node N2, acting as another input element, becomes a third output speed line D3.

In the above third speed state, if vehicle speed and throttle opening are increased, the TCU disengages the first clutch 14 and operates the second brake 20 to be operated.

As a result, first input is released, and by the operation of the second brake 120 the sun gear 44 of the first simple planetary gear set 32 operates as a reaction element, realizing fourth speed.

Referring to FIG. 3, with regard to the shift process of a fourth speed, a line connecting the third node N3 to a point on a line L4 connecting the second input speed line S2, inputted at the second node N2, to the first node N1, acting as a reaction element, becomes a fourth output speed line D4.

Namely, the fourth speed is of an overdrive state faster than input speed.

Also, if a driver changes a selector lever to a reverse R range, the third clutch 12 and the first brake 14 are engaged by the TCU.

When the above happens, the power of the engine is inputted to the sun gear 44 of the first simple planetary gear set 34 and, at the same time, the ring gear 46 of the second simple planetary gear set 34 acts as a reacting element by the operation of the third brake 22, realizing shifting into the reverse "R" range.

Referring to FIG. 3, a line connecting the third node N3 to a point on a line L5 connecting the first input speed line S1 of the first node N1 to the second node N3, acting as reaction element, becomes a reverse output speed line R.

In the gear train of the present invention structured as described above, by utilizing a compound planetary gear set, mounted on a shaft parallel to an input shaft, having simple planetary gear sets combined radially, it is possible to design an automatic transmission having a short length allowing the easy application to a front-wheel-drive vehicle in which the engine is installed transversely.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A gear train for a four-speed automatic transmission used in a vehicle, comprising:

an input shaft connected to an engine;

an intermediate shaft disposed parallel to the input shaft;

a compound planetary gear set mounted on the intermediate shaft, the compound planetary gear set comprising:

a first simple planetary gear set receiving power from the input shaft and comprising a first ring gear and a sun gear, and a second simple planetary gear set receiving power from the input shaft, the second simple planetary gear being combined with the first simple planetary gear set in a radial direction and comprising a second ring gear;

an output shaft aligned with the intermediate shaft and connected to the first and second simple planetary gear sets to output power;

clutch mechanism for selecting an input element of the compound planetary gear set; and brake mechanism for selecting a reacting element of the compound planetary gear set, wherein said brake mechanism comprises a first brake interposed between a transmission housing and said first ring gear, a second brake interposed between said sun gear and the transmission housing, and a third brake interposed between said second ring gear and the transmission housing.

2. The gear train according to claim 1, further comprising first and second input gears mounted on said input shaft, wherein said first simple planetary gear set comprises said sun gear mounted on said intermediate shaft and selectively connected to said first input gear; and first planet gears meshing with said sun gear, said first planet gears being connected to each other by a first planet carrier; and said first ring gear, a radially inner portion of said first ring gear meshing with said first planet gears, wherein said second simple planetary gear set comprises second planet gears meshing with a radially outer portion of said first ring gear, said second planet gears being connected to each other by said second planet carrier; a radially inner portion of said second ring gear meshing with said second planet gears, and said first and second planet carriers being connected to each other by a connector connected to said output shaft.

3. The gear rain according to claim 2, wherein said clutch mechanism further comprises a first clutch interposed between said first input gear and said sun gear, and a second clutch interposed between said second input gear and said second ring gear.

* * * * *